United States Patent Office 2,951,677
Patented Sept. 6, 1960

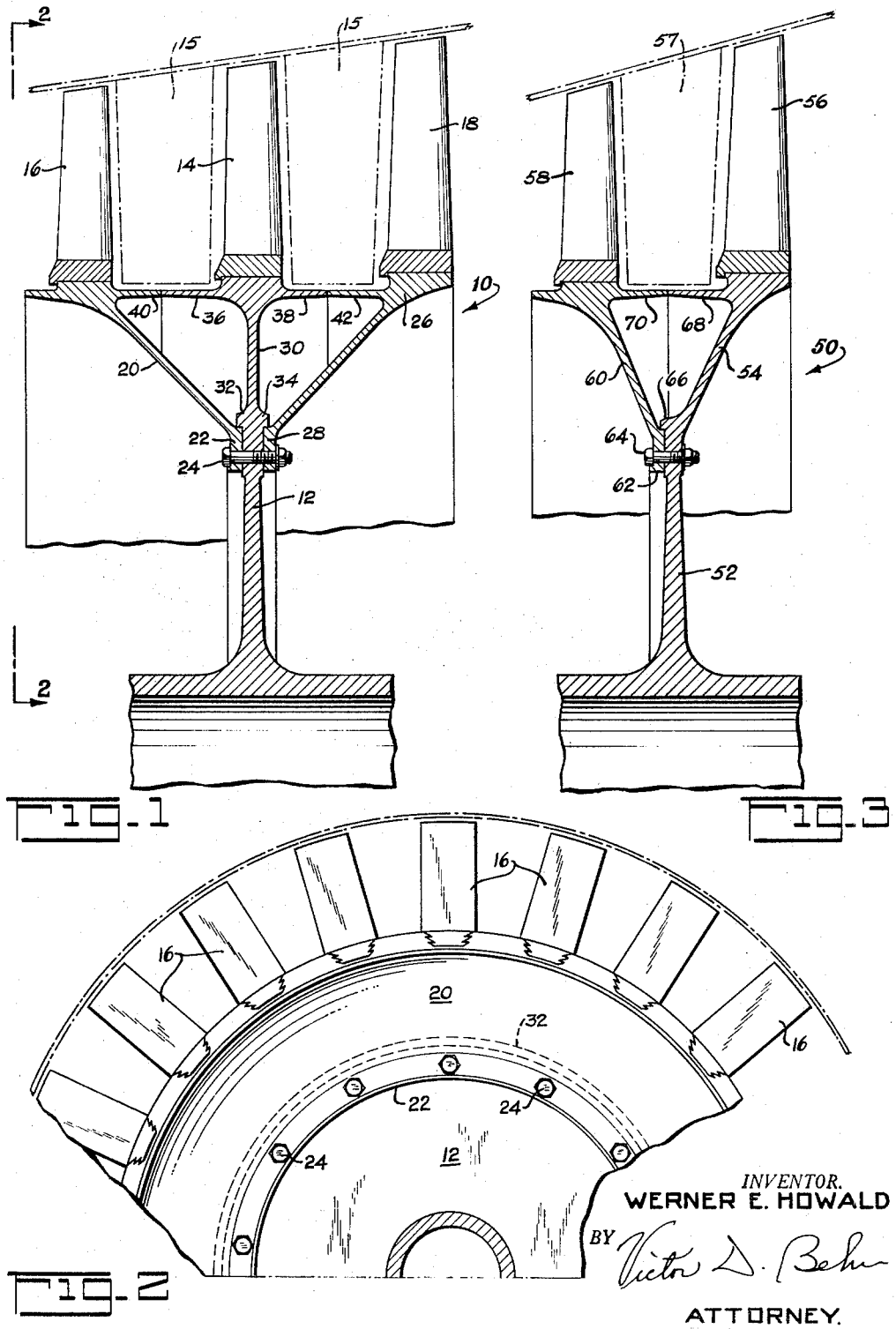

2,951,677

TURBINE ROTOR CONSTRUCTION

Werner E. Howald, Ridgewood, N.J., assignor to Curtiss-Wright Corporation, a corporation of Delaware Filed Mar. 12, 1956, Ser. No. 571,003

1 Claim. (Cl. 253—39)

This invention relates to elastic fluid apparatus, such as turbines and/or compressors, having a rotor with blades extending therefrom for reaction with the elastic fluid. For convenience the invention will be described in connection with a turbine. As will be apparent however the invention is also applicable to other such elastic fluid apparatus.

In general, a multi-stage gas turbine rotor heretofore has comprised a plurality of rotor discs each supporting a stage of turbine rotor blades. If the maximum rotative speed of the turbine is low the allowable values of tangential and radial stress in the turbine rotor disc structure permit a rotor disc thickness which is insufficient to withstand the gyroscopic and gas bending forces on the disc. Such may be the situation for the low pressure turbine of a two-spool turbo-fan aircraft engine. Hence if a separate turbine rotor disc is provided for each turbine rotor blade stage, in order to withstand the gyroscopic and/or gas bending forces the disc must have a thickness which is much larger than it needs to be to withstand the radial and tangential stresses in the disc.

An object of the present invention comprises the provision of a novel multi-stage turbine rotor construction in which a single rotor disc carries a plurality of stages of rotor blades. Such a single disc multi-stage turbine rotor makes more effective use of the rotor disc material, thereby reducing the weight of the turbine rotor, as compared to a multi-stage turbine rotor construction in which a separate rotor disc is provided for each stage of the turbine rotor blades. This saving of weight is made possible because the addition of one or more stages of rotor blades to a single rotor disc increases the tangential and radial stresses in the disc at a greater rate than the rate of increase of the gyroscopic and gas bending forces on the disc. Such weight reduction is of great importance particularly in the case of aircraft, for example where the turbine rotor forms part of an aircraft gas turbine engine.

Other objects of the invention will become apparent upon reading the annexed detailed description in connection with the drawing in which:

Fig. 1 is an axial sectional view of a gas turbine rotor embodying the invention;

Fig. 2 is an end view taken along line 2—2 of Fig. 1; and

Fig. 3 is an axial sectional view similar to Fig. 1 but illustrating a modified construction.

Referring to Figs. 1 and 2 of the drawing, reference numeral 10 designates a three-stage rotor assembly of a gas turbine engine. The rotor assembly 10 comprises a rotor disc 12 having a plurality of circumferentially-spaced blades 14 secured to the rotor disc periphery and extending radially outwardly therefrom. The blades 14 constitute the second stage rotor blades of the turbine.

First stage rotor blades 16 and third stage rotor blades 18 are also supported by the single rotor disc 12. The usual stator structure with its stator blades 15 disposed between the rotor blade stages is shown in dot and dash outline since the stator structure forms no part of the invention. The first stage rotor blades 16 are secured to and extend radially outwardly from the periphery of an annular rim member 20 disposed on one side of the rotor disc 12. The rim member 20 has a conical shape and its periphery is axially spaced upstream from the periphery of the disc 12. The inner portion of the rim member 20 has an annular flange 22 which is clamped to the rotor disc by bolts 24 at a point adjacent to the rim of said disc but spaced inwardly of the periphery of said disc. Likewise the third stage rotor blades 18 are secured to and extend radially outwardly from the periphery of an annular rim member 26 disposed on the opposite side of the rotor disc 12. The rim member 26 has a conical shape and its periphery is axially spaced downstream from the periphery of the disc 12 so that the rim members 20 and 26 are oppositely inclined to the disc 12. The inner portion of the conical rim member 26 has an annular flange 28 which is clamped to the rotor disc 12 by the bolts 24.

With this rotor structure, the rotor 10 has an annular forked rim construction such that the annular rim members 20 and 26 and the rim portion 30 of the rotor disc 12 form the branches of said forked rim construction.

The rotor disc 12 has a pair of annular shoulders 32 and 34 on opposite axial sides of said disc. The shoulder 32 overlies the flange 22 for centering or locating the annular rim member 20 and for transmitting radial loads from said rim member to the rotor disc 12. Likewise the shoulder 34 overlies the flange 28 for centering or locating the annular rim member 26 and for transmitting radial loads from said rim member to the rotor disc 12.

The periphery of the rotor disc 12 is provided with opposite axially extending annular shelf portions 36 and 38 which abut annular shelf portions 40 and 42 respectively extending axially toward the rotor disc 12 from the side rim members 20 and 26. This abutting shelf construction prevents bending or axial deflection of the periphery of the rim members 20 and 26 toward the rotor disc 12 as a result of the centrifugal loads on said rim members and their blades during rotor operation.

Fig. 3 illustrates a modified construction for a two-stage rotor construction. In Fig. 3 reference numeral 50 designates a two-stage rotor comprising a rotor disc 52. The rotor disc 52 has an integral rim portion 54 having a conical shape such that the periphery of said rim portion is displaced axially to one side of the median plane of the portion of said disc disposed inwardly of its rim portion 54. Second stage rotor blades 56 are secured to and extend radially outwardly from the periphery of disc rim portion 54. First stage rotor blades 58 are secured to and extend radially outwardly from the periphery of an annular rim member 60. As in Fig. 1, the usual stator structure with its stator blades 57 between the rotor blades is shown in dot and dash outline.

The rim member 60 has a conical shape and, as compared to the disc rim portion 54, is oppositely inclined to said plane of the disc 52. The inner portion of the annular rim member 60 has an annular flange 62 which is clamped to the rotor disc 52 by bolts 64 at the junction of the main or inner portion of the disc 52 with its rim portion 54. Thus, like the rotor 10, the rotor 50 has a forked rim construction, the rim member 60 and rim portion 54 constituting branches of said forked construction.

At the junction between the main portion of the rotor disc 52 and its rim portion 54 said disc has an annular shoulder 66 overlying the flange 62 on the rim member 60. The shoulder 66 serves to center the rim member 60 and to transmit radial loads from said rim member to the rotor disc 52.

The periphery of the rotor disc rim portion 54 is provided with an annular shelf portion 68 extending axially toward the rim member 60 into abutting engagement with an oppositely extending annular shelf portion 70 on the rim member 60. As in Figs. 1 and 2, this abutting shelf construction of Fig. 3 prevents bending or axial deflection of the peripheries of the rim member 60 and rim portion 54 toward each other as a result of the centrifugal loads thereon during rotor operation.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

A rotor for turbines, compressors or the like; said rotor comprising only a single substantially-flat central disc; three annular branches extending radially-outwardly from said disc; a plurality of circumferentially-spaced blades secured to and extending outwardly from the periphery of each of said annular branches, the central one of said branches being integral with said central disc; means to connect the other two branches to said disc on opposite sides of said central branch, said other two branches being conical and oppositely disposed from said central branch such that said branches diverge from each other in a radially outward direction; and a shelf portion between said branches adjacent to their periphery.

References Cited in the file of this patent

UNITED STATES PATENTS

| | | |
|---|---|---|
| 874,993 | Rice | Dec. 31, 1907 |
| 1,362,405 | Emmet | Dec. 14, 1920 |
| 2,327,839 | Zschokke | Aug. 24, 1943 |
| 2,648,519 | Campini | Aug. 11, 1953 |
| 2,662,685 | Blanc | Dec. 15, 1953 |
| 2,803,397 | Gardiner | Aug. 20, 1957 |
| 2,869,820 | Marchant et al. | Jan. 20, 1959 |

FOREIGN PATENTS

| | | |
|---|---|---|
| 531,730 | Canada | Oct. 16, 1956 |
| 980,131 | France | Dec. 20, 1950 |
| 1,057,171 | France | Oct. 28, 1953 |